Figure 1:
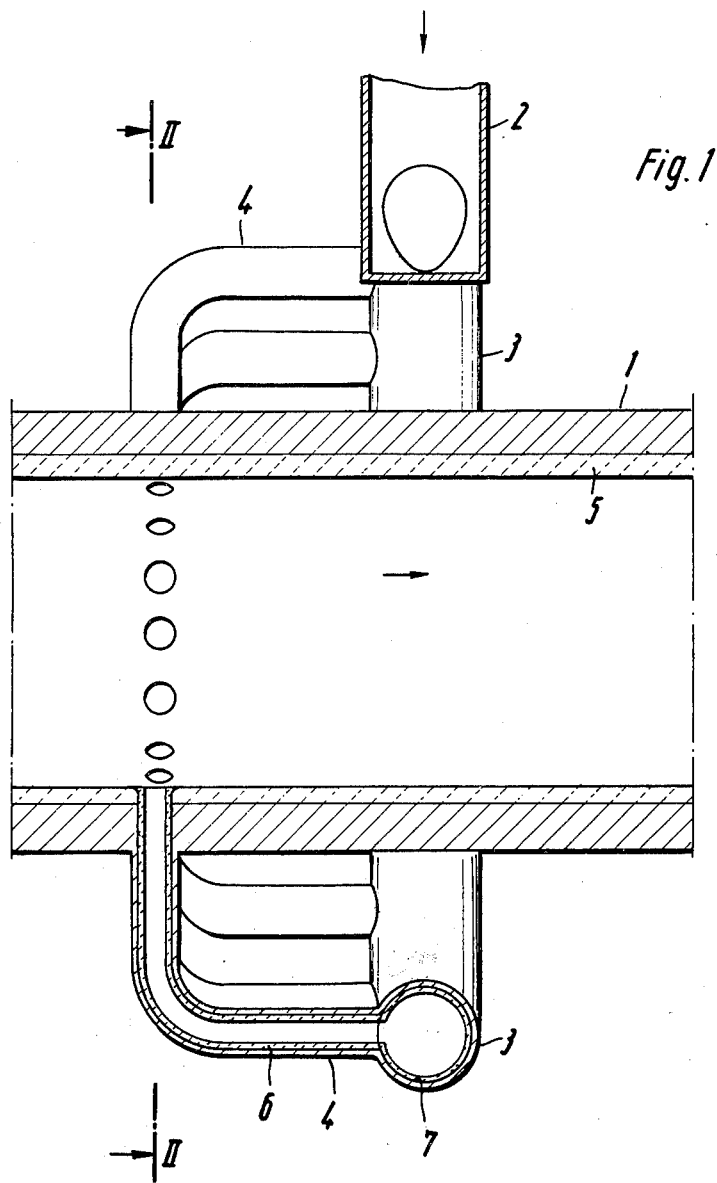

United States Patent [19]
van Laar et al.

[11] 3,913,617
[45] Oct. 21, 1975

[54] APPARATUS FOR MIXING TWO GAS FLOWS

[75] Inventors: Jacobus van Laar, Santpoort; Jacob Felthuis, Oudorp; Hendrik Gustaaf Otto Weber, Heiloo; Hendrik Olivierse, Beverwijk, all of Netherlands

[73] Assignee: Hoogovens IJmuiden BV, Ijmuiden, Netherlands

[22] Filed: Nov. 19, 1973

[21] Appl. No.: 417,115

[30] Foreign Application Priority Data
Nov. 20, 1972 Germany............................ 2256814

[52] U.S. Cl. .................... 137/599; 137/604; 266/30
[51] Int. Cl.² ......................................... F16K 19/00
[58] Field of Search ............... 266/29, 30; 431/222; 239/431; 137/599, 604, 602

[56] References Cited
UNITED STATES PATENTS
2,353,865  7/1944  Armstrong.......................... 137/604
3,690,632  9/1972  Munson ............................... 266/30

FOREIGN PATENTS OR APPLICATIONS
807,176    1/1959  United Kingdom.................... 266/30
1,269,136  5/1968  Germany ............................. 137/604
1,242,644  8/1971  United Kingdom.................. 137/604

*Primary Examiner*—Robert G. Nilson
*Attorney, Agent, or Firm*—Cushman, Darby & Cushman

[57]  ABSTRACT

An apparatus for mixing two gas flows of greatly different temperatures each flowing through a separate conduit is disclosed, wherein means for connecting said two conduits and for admixing the second gas flow from the second conduit into the first gas flow flowing within the first conduit are provided, which means comprise a ring mains completely or partially surrounding said first conduit and a plurality of pipe bends connected to said ring mains and extending in part axially and in part radially relative to said first conduit, whereby said ring mains is connected to said second conduit, and said pipe bends open into said first conduit.

9 Claims, 2 Drawing Figures

APPARATUS FOR MIXING TWO GAS FLOWS

The present invention relates to an apparatus for mixing two gas flows of greatly different temperatures each flowing through a separate conduit, whereby means for connecting said two conduits and for mixing the second gas flow from the second conduit into the first gas flow flowing within the first conduit are provided.

Apparatuses of this type for mixing two gas flows are known, and they are used e.g. as a hot-blast mixing chamber for adding cold mixing air into a hot-blast stream in a metallurgical blast furnace. Hereby, the hot-blast is generated in regenerators or so-called Cowper stoves which operate in accordance with the regeneration principle, whereby three or four regenerators of this type are associated with a single blast furnace.

In practice, it has been found to be necessary to periodically introduce varying quantities of cold air into the manifold for the hot-blast, so that the hot-blast supplied to the blast furnace has a temperature which is constant with time. Such admixture results in difficulties because the temperatures of the two air flows are of greatly different magnitudes. That is, in contrast with the low temperature of the admixed cold air, the temperature of the hot-blast is in the range of from 1100°C to 1450°C. These great temperature differences result in thermal stresses which might cause corresponding deformations and even destruction (damage). This holds true particularly if the mixing does not take place homogeneously. Hereby, severe breakout of the refractory lining of the hot-blast conduit can occur if this conduit is subjected to rapid and high temperature differentials. In first line, such temperature differentials result if the cold air conduit opens transversely into the hot-blast conduit. In such case, extreme thermal stresses are produced also in the steel structure of the two conduits, which stresses frequently cause failure of the conduits. Besides, the required quantity of the cold air would necessitate such a diameter of the cold air conduit as would give cause to difficulties in the refractory lining of the mouth of such conduit.

Accordingly, starting from the abovementioned basic problem, the invention is based upon the object of eliminating the abovementioned disadvantages and to provide an apparatus for mixing two gas flows of greatly different temperatures, wherein an optimum homogeneous admixture is obtained and the occurence of thermal stresses is avoided. Besides, a good cooling of the steel jacket of the hot-blast conduit should be provided. According to the present invention, this object is solved in that the means for connecting the two conduits comprise a ring mains completely or partially surrounding the first conduit and including a plurality of pipe bends connected thereto and extending in part axially and in part radially relative to the first conduit, whereby the ring mains is connected to the second conduit and the pipe bends open into the first conduit. This ensures that the two gas or air flows are homogeneously mixed with each other, so that thermal stresses are minimized since the resulting temperature differences are very small. However, as far as certain thermal stresses are still present, such stresses can be readily taken up (absorbed) by the elasticity of the entire structure, without giving rise to the danger of any harmful deformations or damages.

In accordance with a preferred embodiment, the pipe bends open into the first conduit with an axial spacing from the ring mains, which measure provides the advantage of a particularly high elasticity of the entire structure. If necessary, however, the pipe bends may also open into the first conduit in the same plane as the ring mains.

According to another preferred embodiment, the pipe bends comprise 90° bends each having an axial leg and a radial leg, and these bends extend, by starting from the plane in which the ring mains and the first conduit are positioned, first axially (axial leg) and then radially (radial leg) to the first conduit.

It is of advantage if the length of the axial legs corresponds to about three times the diameter of the ring mains.

According to another preferred embodiment, there is provided a total of from 8 to 16, preferably 12 pipe bends.

Furthermore, it is of advantage if the overall flow cross-section of all of the pipe bends amounts to a maximum of 15%, especially to from 8 to 10% of the flow cross-section of the first conduit. That is, a relatively high velocity of the gas flow or of the cold air, respectively, during the entry into the first conduit from the pipe bends can be obtained thereby. Because of this high impulse, the cold air then enters relatively deeply into the hot-blast flow, such that the refractory lining of the hot-blast conduit is protected and a particularly homogeneous mixing is obtained.

Furthermore, according to the invention the advantage is provided that the cold air is uniformly distributed to the various pipe bends, and that short-circuit flows of the hot-blast through the pipe bends are avoided. However, in view of the fact that the cold air is not continuously admixed, the danger exists that the hot-blast enters the pipe bends and the ring mains. For this reason, it is advisable that not only the first conduit, but also the pipe bends and the ring mains are lined with refractory material.

Figure 2:
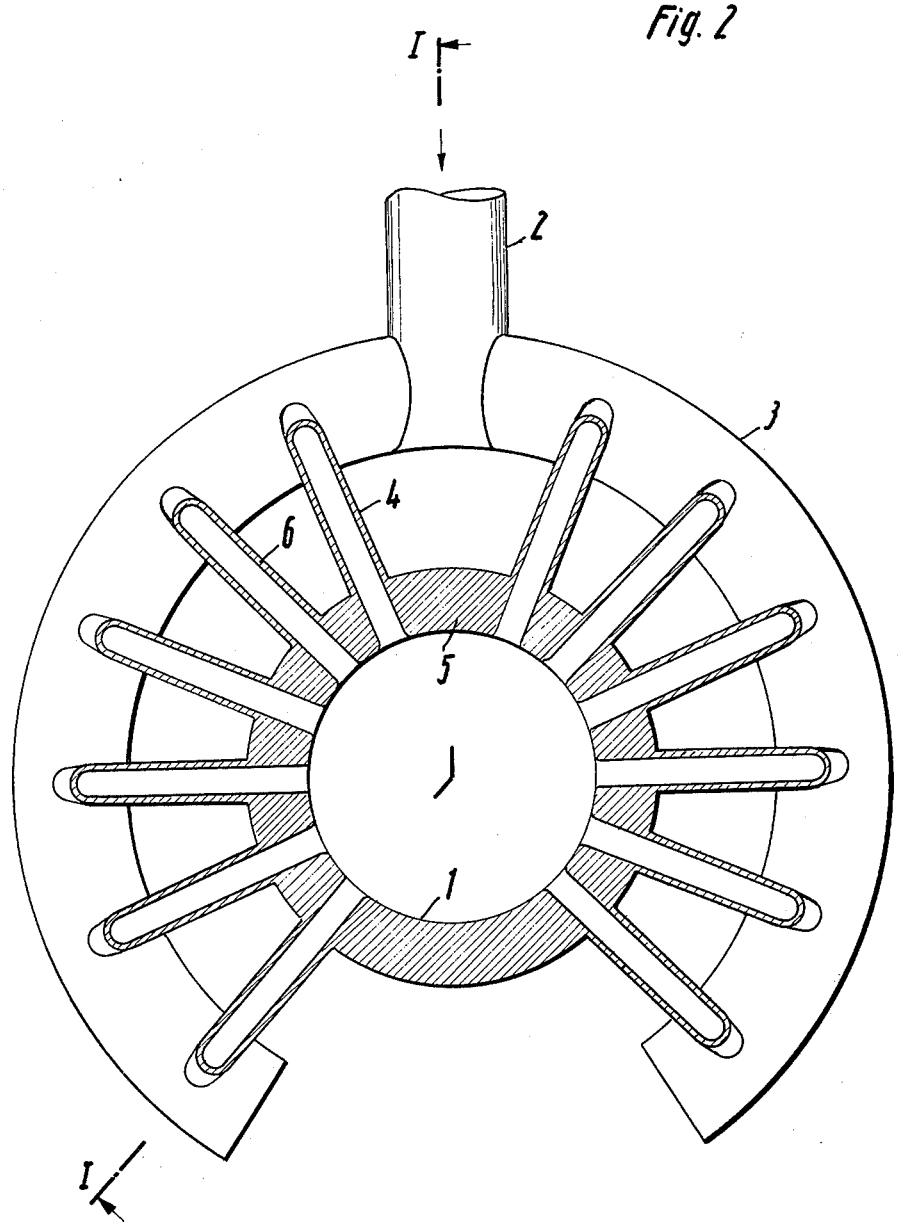

The invention is explained in greater detail in the following specification by means of an exemplary embodiment as shown in the drawings and relating to a hot-blast mixing chamber for a blast furnace constructed in accordance with the invention. In the drawings:

FIG. 1 is a longitudinal section through the mixing chamber along lines I—I of FIG. 1; and FIG. 2 is a cross-sectional view along lines II—II of FIG. 1.

Through a first conduit 1 which represents the hot-blast conduit or main of a blast furnace, a hot-blast flow is passed to which a cold gas flow, namely a cold air flow, should be admixed which passes through a second conduit (cold air conduit) 2. At least in the region of their juncture, the two conduits 1 and 2 are formed rectilinearly and orthogonally relative to each other, whereby the cross-section of the conduit 1 is substantially greater than that of the second conduit 2 and, in the illustrated embodiment, is equal to about 6 times the cross-section of the latter.

A ring mains 3 is connected to the second, cold air carrying conduit 2, which ring mains has a cross-sectional area which is only slightly reduced as compared with the conduit 2. The ring mains 3 surrounds the first conduit 1 in approximately concentric relation and over an angle of about 270° (compare FIG. 2). By means of a total number of 12 pipe bends 4, the ring mains 3 is connected to the first conduit 1. In this case, the pipe bends 4 comprise 90° bends each having an axial leg and a leg extending radially relative to the first conduit 1. Hereby, the length of the axial legs is equal to about three times the diameter of the ring mains 3. The overall flow cross-sectional area of all of the pipe bends 4 amounts to 8.1% of the flow cross-sectional area of the first conduit.

The conduit 1, the ring mains 3 and the pipe bends 4 are each provided with a lining of a refractory material 5, or 7, or 6, respectively.

By means of the hot-blast mixing chamber according to the invention, a very homogeneous admixture of the cold air to the hot-blast is obtained so that thermal stresses and thermal expansions are extremely small. As far as some thermal stresses and thermal expansions are nevertheless still present, these stresses and expansions are readily taken up (absorbed) by the good elasticity of the entire construction, such that the danger of any damage is fully avoided. Besides, the view of the fact that the entire structure remains quite open, good cooling of the jacket of the hot-blast conduit or main is provided for.

Further, there exists the advantage that the great number of pipe bends imparts high stability to the refractory construction of the hot-blast conduit.

Numerous modifications of the illustrated embodiment may be made without departing from the scope of the invention. In particular, it is hereby possible to vary the number of the pipe bends and their specific configuration. Furthermore, in order to further increase the velocity of the cold air flow, it is possible to reduce the flow cross-section of the pipe bends or perhaps of their discharge openings into the hot-blast conduit. If necessary, nozzles may be provided in the region of the discharge openings, too.

Although the invention is described above in connection with a hot-blast mixing chamber, naturally the invention is not restricted to this specific construction, because the mixing apparatus according to the invention may be used for any desired applications where gas streams, perhaps also liquid streams, having high temperature differences are to be mixed with each other.

What we claim is:

1. In an apparatus for mixing two gas flows of greatly different temperatures, comprising a first conduit for a first gas flow and a second conduit for a second gas flow, said second conduit being formed as a ring main which at least partially surrounds said first conduit and which communicates with said first conduit via a plurality of circumferentially spaced connections, the improvement wherein said ring main is positioned with a radial spacing from said first conduit, said connections each comprise 90° pipe bends which extend from said ring main in axial direction relative to said first conduit and which open into said first conduit in radial direction thereof; and said first conduit, said pipe bends and said ring mains are each provided with a refractory lining.

2. In an apparatus according to claim 1 wherein the axially extending portion of said 90° pipe bends has a length equal to about three times the diameter of said ring main.

3. In an apparatus according to claim 2, wherein said radially extending portion of said 90° pipe bends has the same length as said axial leg.

4. In an apparatus according to claim 3 wherein between 8 to 16 pipe bends are provided.

5. In an apparatus according to claim 3 wherein 12 pipe bends are provided.

6. In an apparatus according to claim 1 wherein the overall flow cross-sectional area of all of said pipe bends amounts to a maximum of 15% of the flow cross-section of said first conduit.

7. In an apparatus as in claim 6 wherein said overall area amounts to 8 to 10% of the flow cross-section of said first conduit.

8. In an apparatus according to claim 1 wherein the flow cross-sectional area of said first conduit is substantially greater than that of said second conduit and, is equal to from 4 to 8 times the cross-section of the latter.

9. In an apparatus according to claim 1 wherein said two conduits at least in the region of their juncture, are formed rectilinearly and orthogonally relative to each other.

* * * * *

UNITED STATES PATENT OFFICE
CERTIFICATE OF CORRECTION

Patent No. 3,913,617     Dated October 21, 1975

Inventor(s) Jacobus Van Laar et al

It is certified that error appears in the above-identified patent and that said Letters Patent are hereby corrected as shown below:

Column 3, line 20, "the view of" should read --in view of--.

Column 4, line 14, "mains" should read --main--.

Signed and Sealed this first Day of June 1976

[SEAL]

Attest:

RUTH C. MASON
*Attesting Officer*

C. MARSHALL DANN
*Commissioner of Patents and Trademarks*